United States Patent
Casey et al.

(10) Patent No.: US 7,898,830 B1
(45) Date of Patent: Mar. 1, 2011

(54) SYSTEM AND METHOD OF CONTROLLING THE SOFT START CONTROL VOLTAGE OF SWITCHING REGULATOR IN RESPONSE TO OUTPUT CURRENT SENSING

(75) Inventors: Charles A. Casey, West Kingston, RI (US); Federico Piccitto, Ragusa (IT); Paolo Nora, Belgioioso (IT); Marcello Criscione, Ragusa (IT)

(73) Assignee: Maxim Integrated Products, Inc., Sunnyvale, CA (US)

( * ) Notice: Subject to any disclaimer, the term of this patent is extended or adjusted under 35 U.S.C. 154(b) by 431 days.

(21) Appl. No.: 12/144,942

(22) Filed: Jun. 24, 2008

(51) Int. Cl.
*H02H 7/10* (2006.01)

(52) U.S. Cl. .......................... 363/49; 363/50; 323/901

(58) Field of Classification Search ................. 363/49, 363/50; 323/901
See application file for complete search history.

(56) References Cited

U.S. PATENT DOCUMENTS

| | | | | |
|---|---|---|---|---|
| 4,504,898 A | * | 3/1985 | Pilukaitis et al. ............... | 363/49 |
| 5,479,086 A | * | 12/1995 | Konstanzer .................. | 323/238 |
| 5,751,115 A | * | 5/1998 | Jayaraman et al. .......... | 315/225 |
| 6,693,811 B1 | * | 2/2004 | Bowman et al. .............. | 363/97 |

* cited by examiner

*Primary Examiner* — Bao Q Vu
(74) *Attorney, Agent, or Firm* — North Weber & Baugh LLP

(57) ABSTRACT

An apparatus, such as a Buck converter system, for generating an output voltage while at the same time monitoring whether an overload or over current condition occurs at the output, and protecting the system if the overload or over current condition occurs. The apparatus includes a first circuit adapted to monotonically change a control voltage from a first voltage (e.g., approximately ground potential) towards a second voltage (e.g., a reference voltage $V_{REF}$); a second circuit adapted to generate the output voltage based on the control voltage; a third circuit adapted to detect whether a magnitude of an output current exceeds a current threshold; and a fourth circuit adapted to change the control voltage from the second voltage towards the first voltage in response to the third circuit detecting that the magnitude of the output current exceeds the current threshold.

32 Claims, 6 Drawing Sheets

US 7,898,830 B1

SYSTEM AND METHOD OF CONTROLLING THE SOFT START CONTROL VOLTAGE OF SWITCHING REGULATOR IN RESPONSE TO OUTPUT CURRENT SENSING

FIELD OF THE INVENTION

This invention relates generally to switching regulators, and in particular, to a system and method of controlling the soft start control voltage of a switching regulator in response to output current sensing.

BACKGROUND OF THE INVENTION

A typical switching regulator, such as a Buck converter, employs a high-side metal oxide semiconductor field effect transistor (MOSFET) and a low-side MOSFET in a push-pull configuration to generate an output current for a load. The typical Buck converter further includes a driver circuit to drive the gates of the high- and low-side MOSFETs to generate the output current for the load. A pulse width modulator (PWM) is typically employed to control the driver circuit. The PWM is generally responsive to an output feedback voltage in order to generate the proper control signal to maintain the output voltage of the Buck converter within specification.

In many cases, the load at the output of the Buck converter is unknown, particularly when the converter is initially turned on. In some cases, the load may be significantly large, such as when a deep short is present at the output of the Buck converter. If the Buck converter delivers the full or large output voltage to such a load, the resulting large current may cause damage to the MOSFETs and other components of the converter. Often, the Buck converter includes a soft-start circuitry in order to monotonically increase the output voltage of the Buck converter from approximately zero (0) Volt to a specified output voltage during start-up of the converter. If a large load is present, the ramping output voltage generally eliminates the large initial current, and the Buck converter can be turned off when the current exceeds a predetermined level.

The typical Buck converter monitors the output current only during the time that the low-side MOSFET is conducting. However, these Buck converters are generally not able to limit the instantaneous output current to the predetermined maximum level when the converter is exposed to a deep output short circuit. This happens because the converter output voltage collapses, and the controller regulation loop commands a maximum duty cycle for the high-side MOSFET, with no possibility to limit the current peak during this cycle since the current is monitored only during the time that the low-side MOSFET is conducting. Accordingly, the potential large current during the time when the high-side MOSFET is turned on can cause damage to the MOSFETs and other components of the Buck converter.

SUMMARY OF THE INVENTION

An aspect of the invention relates to an apparatus, such as a Buck converter system, for generating an output voltage while at the same time monitoring whether an overload or over current condition occurs at the output, and protecting the system if the overload or over current condition occurs. The apparatus comprises a first circuit adapted to monotonically change a control voltage in a forward direction from a first voltage (e.g., approximately ground potential) towards a second voltage (e.g., a reference voltage $V_{REF}$); a second circuit adapted to generate the output voltage based on the control voltage; a third circuit adapted to detect whether a magnitude of an output current exceeds a current threshold; and a fourth circuit adapted to change the control voltage in a reverse direction in response to the third circuit detecting that the magnitude of the output current exceeds the current threshold.

In another aspect of the invention, the first circuit is further adapted to monotonically change the control voltage from the first voltage towards the second voltage in response to a starting or activating of the apparatus. In yet another aspect, the first circuit is adapted to change the control voltage from the first voltage towards the second voltage in a step-by-step manner. In still another aspect, the voltage difference between adjacent steps is related to a substantially fixed reference voltage (e.g., $V_{REF}/2^{(N-1)}$, where N is the resolution of a digital-to-analog converter (DAC) adapted to generate the control voltage). In yet another aspect, the duration of each step is substantially equal to a first predetermined number of cycles of a first reference clock.

In another aspect of the invention, the fourth circuit is adapted to change the control voltage in the reverse direction in a step-by-step manner. In yet another aspect, the duration of each step of the changing control voltage in the reverse direction is substantially equal to a second predetermined number of cycles of the first reference clock, wherein the second predetermined number is less than the first predetermined number of cycles of the first reference clock. Alternatively, the duration of each step of the changing control voltage in the reverse direction is substantially equal to a predetermined number of cycles of a second reference clock, wherein the frequency of the second reference clock is greater than the frequency of the first reference clock. In this manner, the fourth circuit is adapted to change the control voltage in the reverse direction at a rate greater than the first circuit is adapted to change the control voltage in the forward direction.

In another aspect of the invention, the apparatus comprises a fifth circuit adapted to disable the second circuit if the control voltage does not reach the second voltage within a first predetermined time interval (e.g., $M \times T_{SS}$). Additionally, the fifth circuit may disable the second circuit for a second predetermined interval (e.g., $T_{HIC}$). Alternatively, or in addition to, the fifth circuit may disable the second circuit in response to the third circuit detecting that the magnitude of the output current has exceeded the current threshold for more than a predetermined duration.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
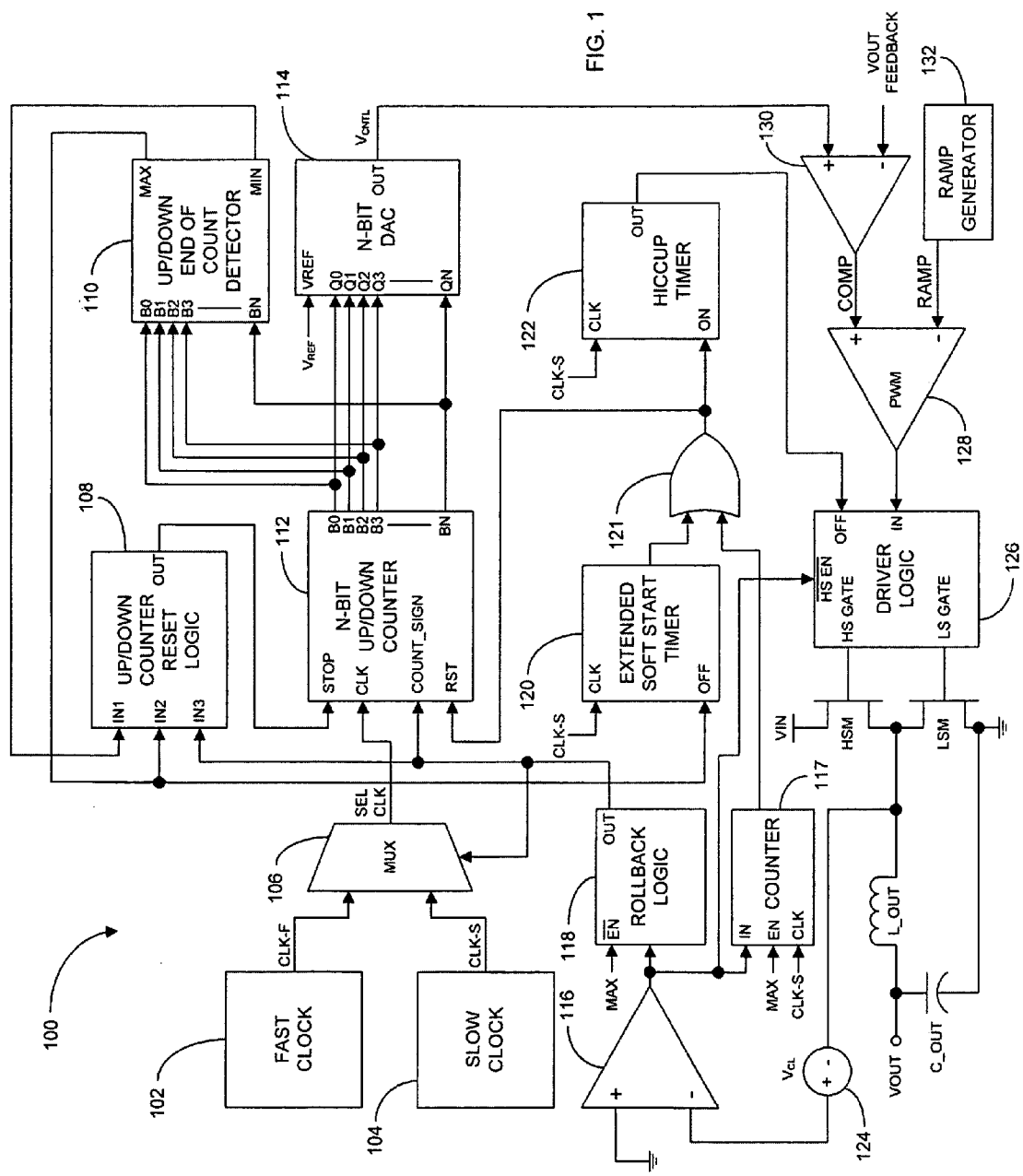
FIG. 1 illustrates a block diagram of an exemplary Buck converter system in accordance with an embodiment of the invention.

FIG. 1 illustrates a block diagram of an exemplary Buck converter system 100 in accordance with an embodiment of the invention. In summary, the Buck converter system 100 includes a soft-start circuit to substantially monotonically increase the output voltage of the converter during a start-up operation. The Buck converter system 100 also includes an output current sensing device coupled with a rollback logic adapted to decrease the output voltage of the system if an overload or over current condition is detected. Additionally, the Buck converter system 100 includes a "hiccup" circuit adapted to disable the output of the system if the overload or over current condition persists for more than a predetermined time interval after the commencement of a start-up operation. Furthermore, the hiccup circuit is adapted to disable the output of the converter if an overload or over current condition occurs for a predetermined duration after a successful soft start. Although a Buck converter is used to exemplify the various aspects and embodiments of the invention, it shall be understood that the concepts described herein may apply to any type of switching regulator, such as a boost converter.

In particular, the Buck converter system 100 comprises a fast clock 102, a slow clock 104, a multiplexer (MUX) 106, an up/down counter reset logic 108, an up/down end-of-count detector 110, an N-bit up/down counter 112, an N-bit digital-to-analog converter (DAC) 114, an overload or over current sensing device 116, a counter 117, a rollback logic 118, an extended soft start timer 120, an OR-gate 121, a hiccup timer 122, a programmable overload or over current reference voltage $V_{CL}$ source 124, a driver logic 126, a pulse width modulator (PWM) 128, a differential amplifier 130, and a ramp generator 132. These devices could be implemented as one or more integrated circuits, one or more discrete devices, and/or a combination of one or more integrated circuits and one or more discrete devices. The Buck converter system 100 may include external or discrete components as well, such as a high-side MOSFET (HSM), low-side MOSFET (LSM), output inductor L_OUT, and output capacitor C_OUT.

More specifically, the slow clock 104 generates a relatively low frequency clock CLK-S for generating a monotonically increasing soft-start control voltage $V_{CNTL}$ during a start-up operation. The fast clock 102 generates a relatively high frequency clock CLK-F for generating a decreasing reference voltage $V_{REF}$ during an overload or over current condition. The fast clock 102 may also be used to increase the control voltage $V_{CNTL}$ when the overload or over current condition ceases. The MUX 106 selects the clock signal SEL CLK from the fast clock 102 or the slow clock 104 based on a signal generated by the rollback logic 118. For example, if no overload or over current condition is detected during a soft start, the rollback logic 118 may generate a low logic level signal, which instructs the MUX 106 to select the clock signal CLK-S from the slow clock 104. If an overload or over current condition is detected during the soft start, the rollback logic 118 may generate a high logic level signal, which instructs the MUX 106 to select the clock signal CLK-F from the fast clock 102.

The N-bit up/down counter 112 generates a count {BN:B0} in response to the selected clock signal SEL CLK applied to its clock input (CLK). Also, the N-bit up/down counter 112 includes a COUNT_SIGN input adapted to receive the signal from the rollback logic 118. For example, if no overload or over current condition is detected during a soft start, the rollback logic 118 may generate a low logic level signal, which instructs the N-bit up/down counter 112 to count incrementally so as to increase the control voltage $V_{CNTL}$. On the other hand, if an overload or over current condition is detected during the soft start, the rollback logic 118 may generate a high logic level signal which instructs the N-bit up/down counter 112 to count decrementally so as to decrease the control voltage $V_{CNTL}$. Additionally, the N-bit up/down counter 112 includes a STOP input adapted to receive signals generated by the up/down counter reset logic 108 to stop counting when the count {BN:B0} reaches its maximum or minimum value, so as to prevent a roll over of the count {BN:B0}.

The N-bit DAC 114 includes inputs {QN-Q0} respectively coupled to the count output {BN:B0} of the N-bit up/down counter 112. The N-bit DAC 114 also receives a substantially fixed reference voltage $V_{REF}$. In response to these inputs, the N-bit DAC 114 generates the control voltage $V_{CNTL}$, which may be substantially equal to the reference voltage $V_{REF}$ multiplied by the current count value {BN:B0} and divided by the maximum count value. In such configuration, during a soft start operation, the N-bit up/down counter 112 generates a count that monotonically increases from 0 to $2^{(N-1)}$. Accordingly, the N-bit DAC 114 generates a voltage that monotonically increases from 0V to $V_{REF}$, so as to produce a monotonically increasing output voltage for the Buck converter system 100.

The up/down end-of-count detector 110 receives as inputs the count {BN:B0} generated by the N-bit up/down counter 112. The up/down end-of-count detector 110 includes a MIN output to generate a high logic level when the count {BN-B0} is at a minimum value (e.g., {BN:B0}={00000 . . . 0}), and a MAX output to generate a high logic level when the count {BN-B0} is at a maximum value (e.g., {BN:B0}={11111 . . . 1}). When the count {BN:B0} is neither at the minimum nor maximum value, the up/down end-of-count detector 110 generates a low logic level at the MIN and MAX outputs. The MIN output of the up/down end-of-count detector 110 is coupled to a first input IN1 of the up/down counter reset logic 108. The MAX output of the up/down end-of-count detector 110 is coupled to a second input IN2 of the up/down counter reset logic 108, to an OFF input of the extended soft start timer 120, to an enable input EN of the counter 117, and to an enable-bar (disable) input of the rollback logic 118.

As discussed above, the up/down counter reset logic 108 includes the first and second inputs IN1-2 respectively coupled to the MIN and MAX outputs of the up/down end-of-count detector 110, and a third input IN3 coupled to the output of the rollback logic 118. The up/down counter reset logic 108 includes an output coupled to the STOP input of the N-bit up/down counter 112. In essence, the up/down counter reset logic 108 prevents the N-bit up/down counter 112 from rolling over when the count reaches its maximum or minimum value. In this example, this is accomplished by the up/down reset logic 108 generating a high logic level in response to a high logic level generated at the MAX output of the up/down end-of-count detector 110 and a low logic level generated by the rollback logic 118, or in response to a high logic level generated at the MIN output of the up/down end-of-count detector 110 and a high logic level generated by the rollback logic 118.

The current sensing device 116 generates a low logic level signal when no overload or over current condition is detected, and generates a high logic level signal when an overload or over current condition is detected. In particular, the current sensing device 116 may be configured as a comparator having a positive input coupled to ground, and a negative input coupled to a programmable voltage source 124 adapted to generate a voltage $V_{CL}$ indicative of the selected current limit or threshold. When the inductor current multiplied by the internal ON resistance RDSON of the LSM produces a negative voltage greater in value than the programmable voltage $V_{CL}$, indicating an overload or over current condition, the comparator 116 generates a high logic level signal. On the other hand, when the inductor current multiplied by the internal ON resistance RDSON of the LSM produces a negative voltage less in value than the programmable voltage $V_{CL}$, indicating no overload or over current condition, the comparator 116 generates a low logic level signal. The output of the current-sensing device 116 is coupled to an input of the rollback logic 118, an input of counter 117, and an HS EN-bar input of the driver logic 126.

During a soft start operation, the rollback logic 118 generates a signal indicative of whether an overload or over current condition is present or not, as detected by the current-sensing device 116. The output of the rollback logic 118 is coupled to a select input of the MUX 106, the COUNT_SIGN input of the N-bit up/down counter 112, and the third input IN3 of the up/down counter reset logic 108. As an example, if the rollback logic 118 generates a low logic level signal, indicating that no overload or over current condition exists, the MUX 106 selects the clock signal CLK-S from the slow clock 104 to cause the control voltage $V_{CNTL}$ to rise slowly, and the N-bit up/down counter 112 counts incrementally to cause the control voltage $V_{CNTL}$ to rise. On the other hand, if the rollback logic 118 generates a high logic level signal, indicating that an overload or over current condition exists, the MUX 106 selects the clock signal CLK-F from the fast clock 102 to cause the control voltage $V_{CNTL}$ to fall rapidly, and the N-bit up/down counter 112 decrements the count so as to cause the control voltage $V_{CNTL}$ to fall. Once a soft start has been successfully completed by the control voltage $V_{CNTL}$ reaching the reference voltage $V_{REF}$, the up/down end-of-count 110 generates a high logic level at the MAX output, which disables the rollback logic 118 during normal (non-start) operation of the system 100.

The extended soft start timer 120 generates a signal to initiate the hiccup timer 122 to effectively disable the driver logic 126 if the control voltage $V_{CNTL}$ does not reach $V_{REF}$ by a predetermined time interval. For instance, the predetermined time interval may be set to $M \times T_{SS}$, where M is an integer and $T_{SS}$ is a predetermined time interval related to an expected time for the control voltage $V_{CNTL}$ to reach the reference voltage $V_{REF}$ during a normal soft start operation. The extended soft start timer 120 receives the slow clock signal CLK-S from which the timer 120 determines the predetermined time interval $M \times T_{SS}$. Additionally, the extended soft start timer 120 includes an OFF input coupled to the MAX output of the up/down end-of-count detector 110, which disables the timer if the count {BN:B0} reaches its maximum value before the predetermined time interval $M \times T_{SS}$. The output of the extended soft start timer 120 is coupled to a reset (RST) input of the N-bit up/down counter 112 via the OR-gate 121 to reset the count {BN:B0} when the hiccup timer 122 is initiated. The output of the extended soft start timer 120 is also coupled to the hiccup timer 122 via the OR-gate 121.

The counter 117 also generates a signal to initiate the hiccup timer 122 to effectively disable the driver logic 126 if an overload or over current condition persists for a predetermined time interval (e.g., seven (7) clock cycles), once the control voltage $V_{CNTL}$ has reached the reference voltage $V_{REF}$. The counter 117 includes an input to receive the output of the current sensing device 116, which informs it whether an overload or over current condition is present. The counter 117 also includes an input to receive the MAX signal from the up/down end-of-count detector 110, which enables the counter 117 after a successful completion of a soft start operation. The counter 117 further includes an input to receive the slow clock signal CLK-S, which allows the counter to determine the predetermined time interval for which the overload or over current condition has to persists before generating the signal that initiates the hiccup timer 122. The output of the counter 117 is coupled to the hiccup timer 122 via the OR-gate 121.

The hiccup timer 122, when initiated, generates a signal to turn off the driver logic 126 for a predetermined time interval $T_{HIC}$. As previously discussed, the hiccup timer 122 is initiated by the extended soft start timer 120 when the control voltage $V_{CNTL}$ fails to reach $V_{REF}$ during a soft start operation within a predetermined time interval $M \times T_{SS}$. Additionally, the hiccup timer 122 is initiated by the counter 117 when an overload or over current condition occurs after the control voltage $V_{CNTL}$ reaches $V_{REF}$, and the overload or over current condition persists for a predetermined time interval. The hiccup timer 122 includes an input to receive the slow clock signal CLK-S, from which it determines the predetermined time interval $T_{HIC}$. The hiccup timer 122 further includes an ON input coupled to the output of the OR-gate 121, to receive the initiating signal from the extended soft start timer 120 or the counter 117. The output of the hiccup timer 122 is coupled to an OFF input of the driver logic 126.

The differential amplifier 130 generates a compensation signal COMP for controlling the output voltage of the Buck converter system 100. The differential amplifier 130 includes a positive input adapted to receive the control voltage $V_{CNTL}$ from the N-bit DAC 114. The differential amplifier 130 also includes a negative input adapted to receive a feedback voltage from the output of the Buck converter system 100. Additionally, the differential amplifier 130 includes an output adapted to generate the compensation signal COMP, which is related to a difference between the control voltage $V_{CNTL}$ and the feedback output voltage $V_{OUT}$. During normal operations, the control voltage $V_{CNTL}$ is substantially equal to the reference voltage $V_{REF}$, which the feedback operation causes the output voltage of the Buck converter to be substantially equal to the reference voltage $V_{REF}$.

The pulse width modulator (PWM) 128 generates the pulse width modulated signal for the driver logic 126 for controlling the output voltage of the Buck converter system 100. The PWM 128 includes a positive input adapted to receive the COMP signal from the differential amplifier 130. The PWM 128 includes a negative input adapted to receive a periodic ramp signal generated by the ramp generator 132. In response to the COMP and RAMP signals, the PWM 128 generates the pulse width modulated signal for the driver logic 126.

The driver logic 126 generates the control signals for driving the gates of the HSM and LSM to achieve an output voltage of the Buck converter 100 as dictated by the pulse width modulated signal generated by the PWM 128. As previously discussed, the driver logic 126 includes an input to receive the pulse width modulated signal from the PWM 128, an OFF input to receive the signal generated by the hiccup timer 122 when a hiccup event is to take place, and an HS EN-bar input to receive the signal generated by the current sensing device 116. The driver logic 126 includes a first output coupled to the gate of the HSM, and a second output coupled to the gate of the LSM. The driver logic 126 operates the HSM and LSM in a periodic push-pull fashion. For each period, the amount of time the HSM is turned on as compared to the amount of time the LSM is turned on, sets the output voltage VOUT of the Buck converter 100. As previously discussed, when the current sensing device 116 detects an overload or over current condition, it generates a high logic level signal, which causes the driver logic 126 to disable the drive signal for the HSM, for one or more pulses depending on how long the device 116 keeps generating the high logic level signal. This helps lower the output voltage VOUT rapidly during an overload or over current condition.

The HSM and LSM are effectively connected in series between supply voltage VIN and ground potential. In particular, the drain of HSM is coupled to the power supply rail VIN, the source of HSM and drain of LSM are coupled together, and the source of LSM is coupled to the ground potential rail. The output inductor L_OUT is coupled between the output of the Buck converter 100 and the source of the HSM (and drain of the LSM). The programmable (current limit) voltage source 124 is coupled between the negative input of the current sensing device 116 and the source of the HSM (and drain of the LSM). The output capacitor C_OUT is coupled between the output of the Buck converter 100 and ground. With reference to the following FIGS. 2-5, the overall operations of the Buck converter system 100 will now be discussed.

Figure 2:
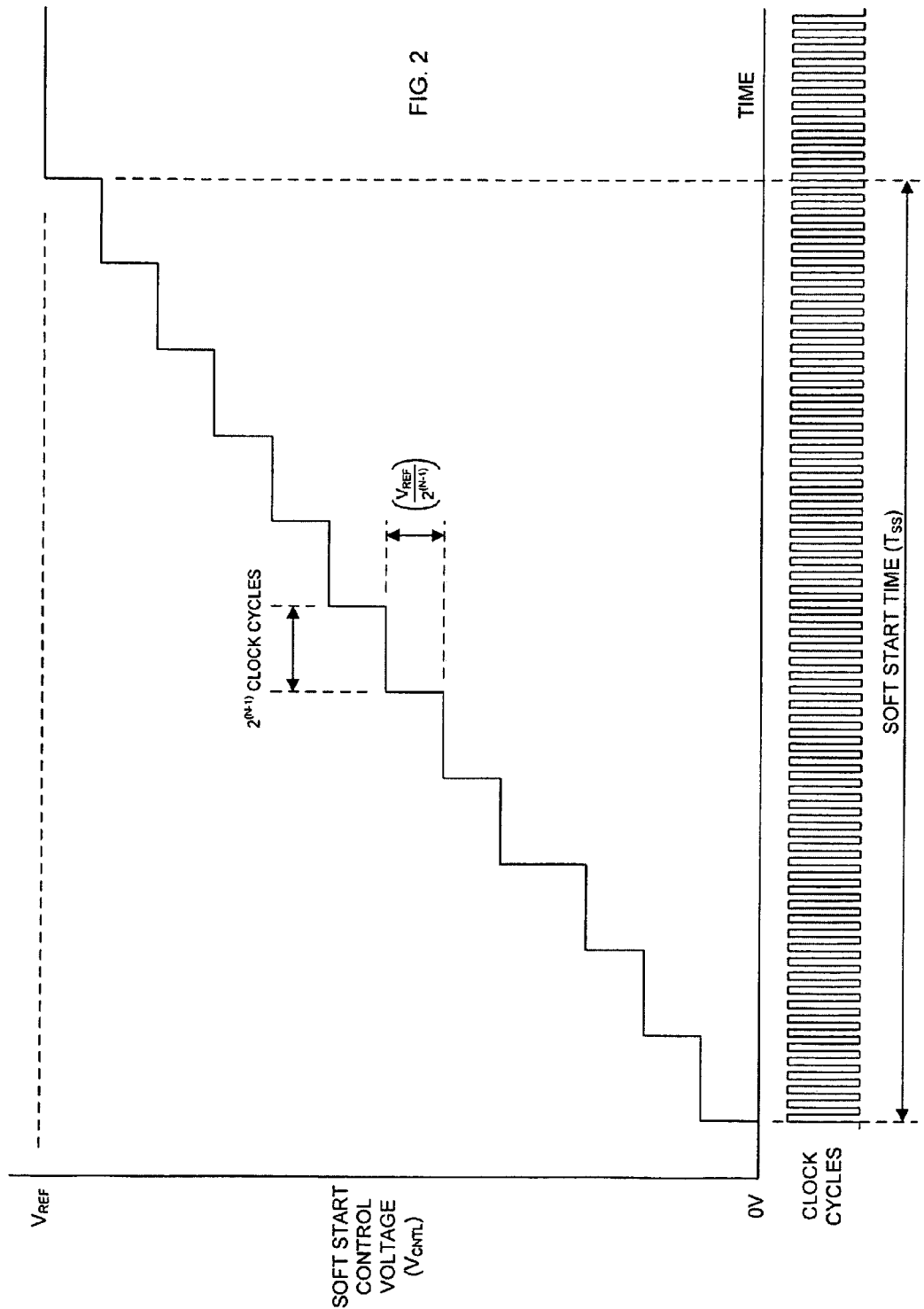
FIG. 2 illustrates a graph an exemplary control voltage $V_{CNTL}$ generated by the Buck converter system in a normal load condition in accordance with another embodiment of the invention.

FIG. 2 illustrates a graph of an exemplary control voltage $V_{CNTL}$ generated by the Buck converter system 100 in a normal load condition in accordance with another embodiment of the invention. The y- or vertical axis of the graph represents the control voltage $V_{CNTL}$, and the x- or horizontal axis represents time. As the graph shows, in a normal soft start operation (e.g., no overload or over current condition), the control voltage $V_{CNTL}$ generated by the N-bit DAC 114 is stepped up monotonically from zero (0) V to the reference voltage $V_{REF}$. Each step, the control voltage $V_{CNTL}$ is increased by an amount substantially equal to $V_{REF}/2^{(N-1)}$, where $V_{REF}$ is the substantially fixed voltage applied to the N-bit DAC 114 and N is the bit resolution of the DAC 114. Additionally, the duration of a step may be substantially equal to $2^{(N-1)}$ clock cycles of the selected clock signal SEL CLK. When the control voltage $V_{CNTL}$ substantially reaches the reference voltage $V_{REF}$, the differential amplifier 130, PWM 128, and driver logic 126 controls the output voltage VOUT such that it is substantially equal to $V_{REF}$, as previously discussed.

Although, in this example, the control voltage $V_{CNTL}$ is changed monotonically in an increasing manner, it shall be understood that the control voltage $V_{CNTL}$ can be changed monotonically in a decreasing manner. This may be applicable to when the specified output voltage VOUT is negative. Additionally, although, in the example, the control voltage $V_{CNTL}$ is changed monotonically in a substantially linear fashion, it shall be understood that the control voltage $V_{CNTL}$ can be changed monotonically in a non-linear fashion.

Figure 3:
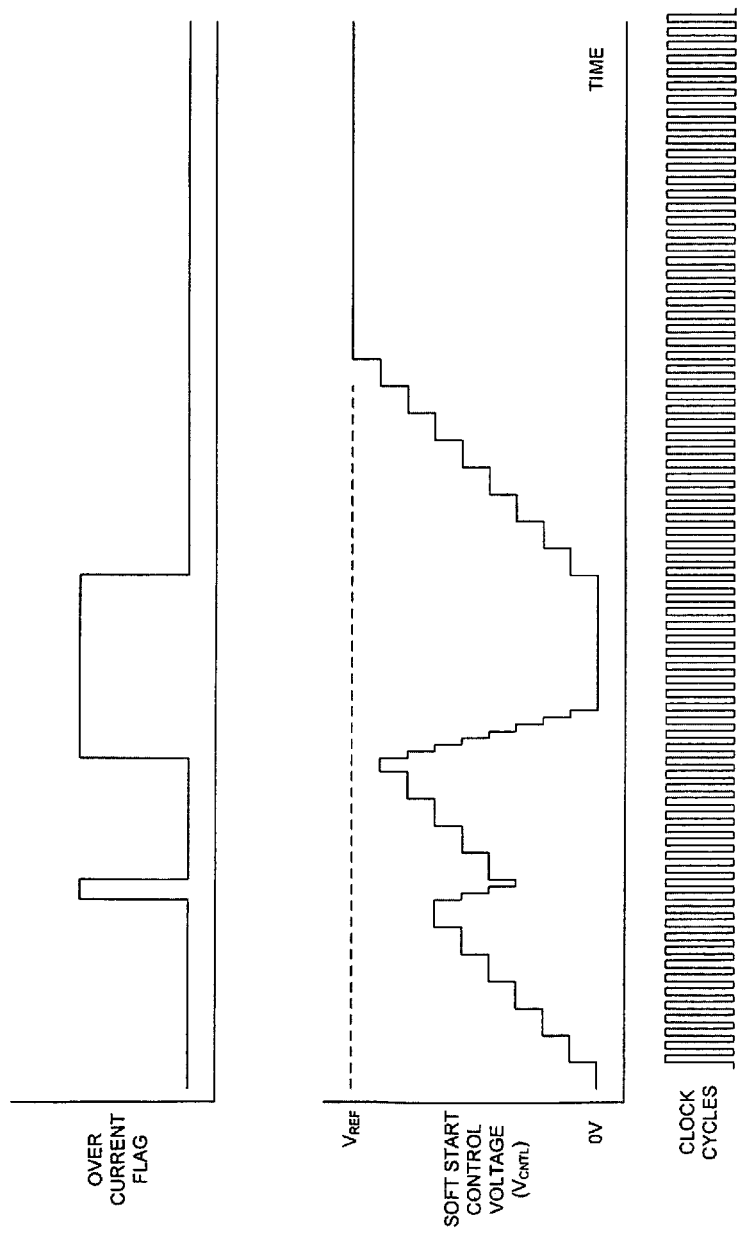
FIG. 3 illustrates a graph of an exemplary control voltage $V_{CNTL}$ and corresponding over current flag generated by the Buck converter system in an overload load condition in accordance with another embodiment of the invention.

FIG. 3 illustrates a graph of an exemplary control voltage $V_{CNTL}$ and over current flag generated by the Buck converter system 100 in accordance with another embodiment of the invention. In particular, the y- or vertical axis of the lower graph illustrates the control voltage $V_{CNTL}$, the y- or vertical axis of the upper graph illustrates the over current flag, and the x- or horizontal axes for both graphs represent time. As the graph shows, the soft start operation begins with the control voltage $V_{CNTL}$ rising from zero (0) V monotonically towards the reference voltage $V_{REF}$.

However, in this example, before the control voltage $V_{CTNL}$ reaches the reference voltage $V_{REF}$, the current sensing device 116 detects an overload or over current condition and generates a high logic level signal as shown. This causes the rollback logic 118 to generate a high logic level signal that causes the MUX 106 to select the clock CLK-F from the fast clock 102 and the N-bit up/down counter 112 to decrement the count {BN:B0}. The result of this is that the control voltage $V_{CNTL}$ decreases quickly so as to drop the output current below the programmable limit. In this example, the length of each step of the decrementing control voltage may be reduced to one (1) clock cycle to cause the control voltage $V_{CNTL}$ to decrease quickly, so as to avoid any potential damage caused by the over current. Further, in this example, the current sensing device 116 subsequently detects that the overload or over current condition ceases, and thus generates a low logic level signal. In response, the rollback logic 118 generates a low logic level signal, which causes the MUX 106 to select the clock CLK-S of the slow clock 104 again and causes the N-bit up/down counter 112 to again count incrementally. This causes the control voltage $V_{CNTL}$ to rise again, as shown in the diagram.

An overload or over current condition may occur again as shown in the exemplary graph, and thus the same process is repeated to rapidly decrease the control voltage $V_{CNTL}$ so as to avoid potential damage to the Buck converter 100 from the over current. In this example, the control voltage $V_{CNTL}$ decreases all the way down to zero (0) V, where it remains until the overload or over current condition ceases. Then, as shown in the example, when the overload or over current condition is no longer detected, the control voltage $V_{CNTL}$ monotonically increases until it reaches the reference voltage $V_{REF}$.

The use of the overload or over current protection as described herein produces an additional benefit that the output voltage of the Buck converter system 100 is increased in a manner that takes into account the capacitance of the output capacitor C_OUT. For example, if the output capacitor C_OUT is relatively large, a fast rising output voltage may cause an overload or over current condition to occur. As a result, the overload or over current protection scheme prevents the output voltage to increase in a manner that would cause an overload or over current condition to occur. Thus, the output voltage of the Buck converter system 100 is increased in a manner that the output current is maintained substantially at the programmable current limit or below. Another advantage of the system 100 is that it minimizes the HSM pulse width, thereby minimizing the inductor current ripple during an overload or over current event. This, in turn, has the effect of minimizing the audible noise power of the system 100 during a soft start into a relatively large output capacitor C_OUT.

Figure 4:
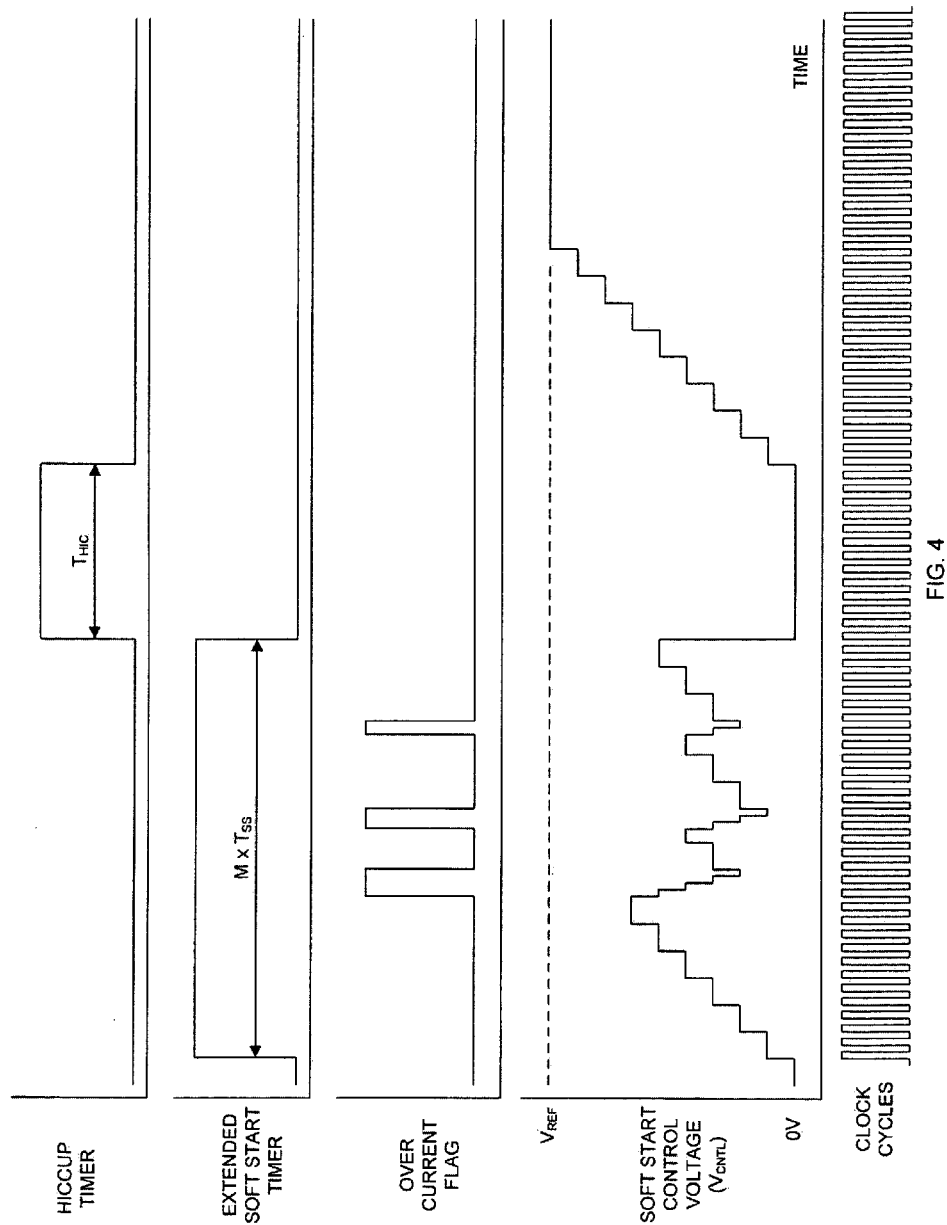
FIG. 4 illustrates a graph of an exemplary control voltage $V_{CNTL}$, over current flag, extended soft start timer parameter, and hiccup timer signal generated by the Buck converter system in an extended overload load condition in accordance with another embodiment of the invention.

FIG. 4 illustrates a graph of an exemplary control voltage $V_{CNTL}$, over current flag, the predetermined time interval of the extended soft start timer, and hiccup timer output generated by the Buck converter system 100 in an extended overload load condition in accordance with another embodiment of the invention. The y- or horizontal axes of the four graphs shown from top to bottom illustrate the output of the hiccup timer 122, the predetermined time interval of the extended soft start timer 120, the over current flag generated by the current sensing device 116, and the control voltage $V_{CNTL}$ generated by the N-bit DAC 114, respectively. The x- or horizontal axes of the graphs represent time.

In this example, the control voltage $V_{CNTL}$ does not reach the reference voltage $V_{REF}$ within the predetermined time interval $M \times T_{SS}$ of the extended soft start timer 120, and thus a hiccup event is triggered to effectively disable the Buck converter 100 for a predetermined time interval $T_{HIC}$. In particular, as per the typical soft start operation, the control voltage $V_{CNTL}$ is increased monotonically from zero (0) V towards the reference voltage $V_{REF}$ as shown. However, during the soft start, the current sensing device 116 detects three (3) overload or over current conditions. In response to each overload or over current condition, the control voltage $V_{CNTL}$ is decreased until the condition is no longer present. In this example, the control voltage $V_{CNTL}$ does not reach the reference voltage $V_{REF}$ by the predetermined time interval $M \times T_{SS}$ of the extended soft start timer 120.

As a consequence, the extended soft start timer 120 generates a signal to initiate the hiccup timer 122. In response, the hiccup timer 122 generates a signal to effectively disable the driver logic 126 for a predetermined time interval $T_{HIC}$. During this time, the control voltage $V_{CNTL}$ is set to zero (0) V by the resetting of the N-bit up/down counter 112 caused by the signal generated by the extended soft start timer 120. After the end of the predetermined hiccup time interval $T_{HIC}$, a new soft start operation is commenced as shown by the control voltage $V_{CNTL}$ being monotonically incremented to the reference voltage $V_{REF}$ in the case where there are no more overload or over current conditions.

Figure 5:
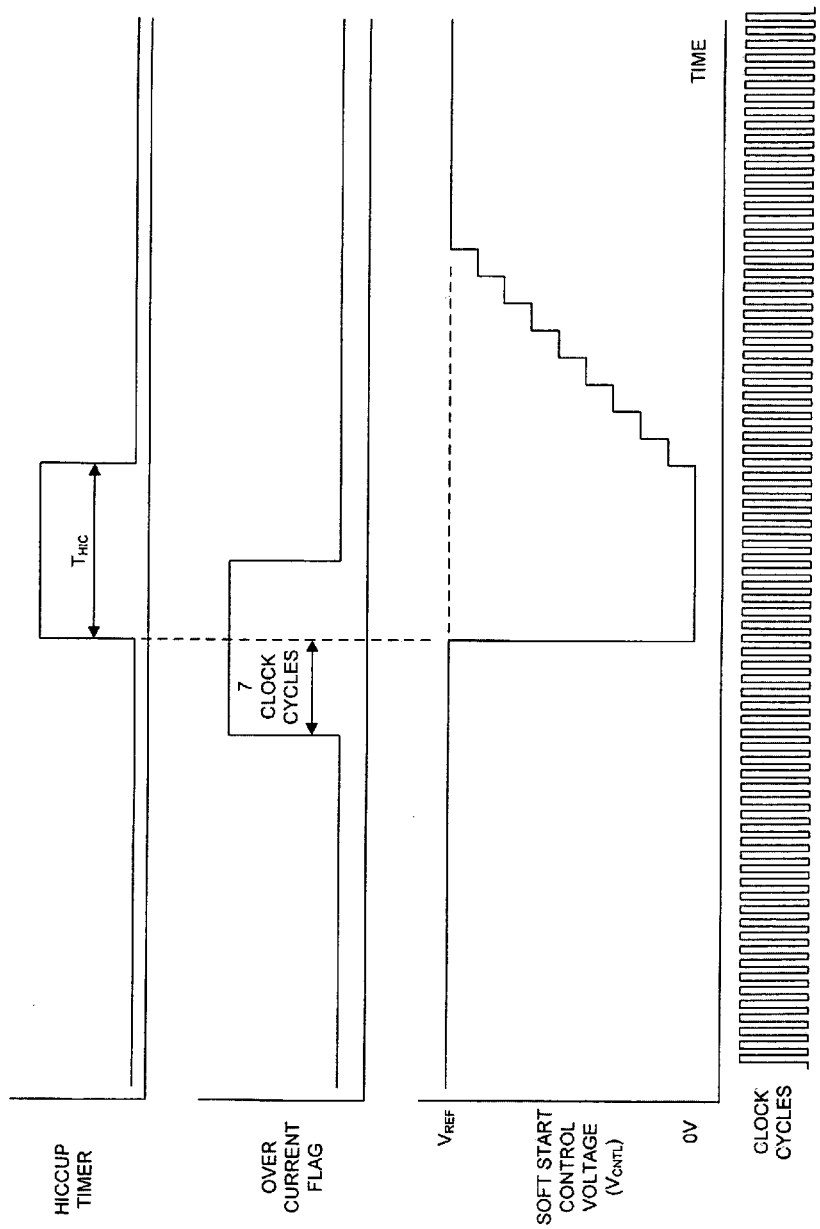
FIG. 5 illustrates a graph of an exemplary control voltage $V_{CNTL}$, over current flag, and hiccup timer signal generated by the Buck converter system in an overload load condition occurring after a successful soft start in accordance with another embodiment of the invention.

FIG. 5 illustrates a graph of an exemplary control voltage $V_{CNTL}$, over current flag, and the output of the hiccup timer in an overload load condition occurring after a successful soft start in accordance with another embodiment of the invention. The y- or vertical axes of the lower, middle, and upper graphs represent the control voltage $V_{CNTL}$, over current flag, and the hiccup signal, respectively. The x- or horizontal axes represent time.

In this example, the control voltage $V_{CNTL}$ has reached the reference voltage $V_{REF}$ in a normal soft start scenario. While the control voltage $V_{CNTL}$ is substantially at the reference voltage $V_{REF}$, the current sensing device 116 detects an overload or over current condition. In response, the current sensing device 116 generates a high logic level signal, which causes the counter 117 to count cycles of the slow clock signal CLK-S. If the overload or over current condition persists for a predetermined time interval (e.g., seven (7) cycles of the slow clock CLK-S), the counter 117 generates a signal to initiate the hiccup timer 122. The hiccup timer 122, in turn, generates a signal to effectively disable the driver logic 126 for a predetermined time interval $T_{HIC}$. During this time, the control voltage $V_{CNTL}$ is set to zero (0) V by the resetting of the N-bit up/down counter 112 caused by the signal generated by the counter 117. After the end of the predetermined hiccup time interval $T_{HIC}$, a new soft start operation is commenced as shown by the control voltage $V_{CNTL}$ being monotonically incremented to the reference voltage $V_{REF}$ in the case where there are no more overload or over current conditions.

Figure 6:
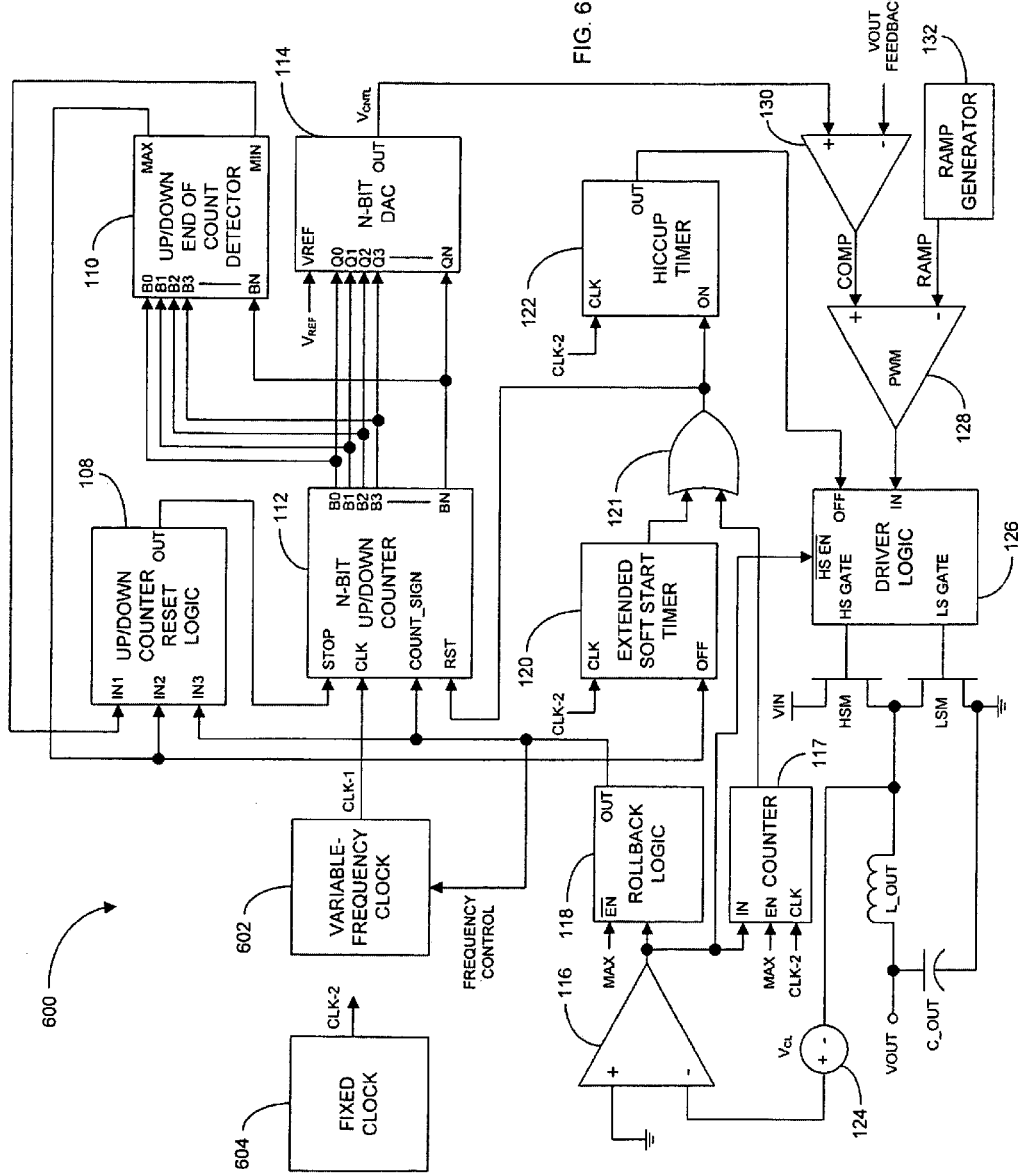
FIG. 6 illustrates a block diagram of another exemplary Buck converter system in accordance with another embodiment of the invention.

FIG. 6 illustrates a block diagram of another exemplary Buck converter system 600 in accordance with an embodiment of the invention. The Buck converter system 600 is similar to the previously-discussed system 100, and includes many of the same elements as indicated by the same reference numbers. The Buck converter system 600 differs in that it includes a variable-frequency clock source 602 for driving the N-bit up/down counter 112. The variable-frequency clock source 602 includes an output to generate a clock signal CLK-1 to drive the N-bit up/down counter 112. The variable-frequency clock source 602 includes an input coupled to the output of the rollback logic 118. The Buck converter system 602 also includes a fixed clock 604 for generating a substantially fixed-frequency clock CLK-2 for driving the counter 117, extended soft start timer 120, and hiccup timer 122.

In this configuration, the signal generated by the rollback logic 118 may control the frequency of the clock signal CLK-1. For example, when an overload or over current condition is not present, the signal generated by the rollback logic 118 may control the variable-frequency clock source 602 to generate a clock signal CLK-1 having a relatively low frequency. Conversely, when an overload or over current condition is present, the signal generated by the rollback logic 118 may control the variable-frequency clock source 602 to generate a clock signal CLK-1 having a relatively high frequency.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for generating an output voltage, comprising:
    a first circuit adapted to monotonically change a control voltage in a forward direction from a first voltage toward a second voltage;
    a second circuit adapted to generate the output voltage from the control voltage;
    a third circuit adapted to detect whether a magnitude of an output current exceeds a current threshold; and
    a fourth circuit adapted to change the control voltage in a reverse direction in response to the third circuit detecting that the magnitude of the output current exceeds the current threshold.

2. The apparatus of claim 1, wherein the first circuit is further adapted to monotonically change the control voltage from the first voltage towards the second voltage in response to a start-up operation.

3. The apparatus of claim 1, wherein the first circuit is adapted to monotonically change the control voltage from the first voltage towards the second voltage in a step-by-step manner.

4. The apparatus of claim 3, wherein a voltage difference between adjacent steps is related to a substantially fixed reference voltage.

5. The apparatus of claim 3, wherein a duration of each step of the monotonically changing control voltage is substantially equal to a first predetermined number of cycles of a first reference clock.

6. The apparatus of claim 5, wherein the fourth circuit is adapted to change the control voltage in a step-by-step manner.

7. The apparatus of claim 6, wherein a duration of each step of the changing control voltage in the reverse direction is substantially equal to a second predetermined number of cycles of the first reference clock, wherein the second predetermined number is less than the first predetermined number.

8. The apparatus of claim 6, wherein a duration of each step of the changing control voltage in the reverse direction is substantially equal to a second predetermined number of cycles of a second reference clock, wherein the frequency of the second reference clock is greater than the frequency of the first reference clock.

9. The apparatus of claim 1, wherein the fourth circuit is adapted to change the control voltage in the reverse direction at a rate greater than the first circuit is adapted to change the control voltage in the forward direction.

10. The apparatus of claim 1, further comprising a fifth circuit adapted to disable at least a portion of the second circuit if the control voltage does not reach the second voltage within a first predetermined time interval.

11. The apparatus of claim 10, wherein the fifth circuit is adapted to disable the at least portion of the second circuit for a second predetermined time interval.

12. The apparatus of claim 1, further comprising a fifth circuit adapted to disable at least a portion of the second circuit in response to the third circuit detecting the magnitude of the output current exceeding the current threshold for more than a predetermined duration.

13. The apparatus of claim 1, wherein the first circuit comprises:
   a clock adapted to generate a clock signal;
   a counter adapted to generate a count responsive to the clock signal; and
   a digital-to-analog converter (DAC) adapted to generate the control voltage based on the count.

14. The apparatus of claim 13, further comprising a fifth circuit adapted to prevent the count from rolling over.

15. The apparatus of claim 14, wherein the fifth circuit comprises:
   an end-of-count detector adapted to generate a first signal when the count is at a minimum or maximum value;
   a rollback logic adapted to generate a second signal indicative of whether the counter is counting incrementally or decrementally; and
   a reset logic adapted to stop the count in response to the first and second signals.

16. The apparatus of claim 1, wherein the second circuit comprises:
   a differential amplifier adapted to generate a compensation signal that is related to a difference between the control voltage and a feedback voltage;
   a ramp generator adapted to generate a ramp signal; and
   a pulse width modulator (PWM) adapted to generate a PWM signal based on the compensation and ramp signals.

17. The apparatus of claim 16, wherein the second circuit further comprises a driver logic adapted to generate drive signals for a pair of push-pull transistors based on the PWM signal.

18. The apparatus of claim 17, wherein the driver logic is adapted to disable at least one of said push-pull transistors in response to the third circuit detecting that the magnitude of the output current exceeds the current threshold.

19. The apparatus of claim 1, wherein the third circuit comprises:
   a comparator adapted to generate a signal indicative of when the magnitude of the output current exceeds the current threshold, wherein the comparator includes a first input coupled to a reference potential; and
   a voltage source coupled between an output of the apparatus and a second input of the comparator, wherein the voltage source is programmable to set the current threshold.

20. The apparatus of claim 1, wherein the fourth circuit comprises:
   a clock adapted to generate a clock signal;
   a counter adapted to generate a count responsive to the clock signal;
   a digital-to-analog converter (DAC) adapted to generate the control voltage based on the count; and
   a rollback logic adapted to reverse a counting direction of the counter in response to the third circuit detecting that the magnitude of the output current exceeds the current threshold.

21. The apparatus of claim 10, wherein the fifth circuit comprises:
   a first timer adapted to generate a first signal in response to the control voltage not reaching the second voltage within the first predetermined time interval; and
   a second timer adapted to generate a second signal to disable the second circuit for a predetermined duration in response to the first signal.

22. The apparatus of claim 12, wherein the fifth circuit comprises:
   a counter adapted to generate a first signal in response to the third circuit indicating that the magnitude of the output current exceeds the current threshold for the predetermined duration; and
   a timer adapted to generate a second signal to disable the second circuit for the predetermined duration in response to the first signal.

23. A method of generating an output voltage, comprising:
   generating a control voltage that monotonically changes in a forward direction from a first voltage toward a second voltage;
   generating the output voltage based on the control voltage;
   detecting whether a magnitude of an output current exceeds a current threshold; and
   changing the control voltage in a reverse direction in response to the magnitude of the output current exceeding the current threshold.

24. The method of claim 23, wherein generating the control voltage comprises monotonically changing the control voltage from the first voltage towards the second voltage in response to a start-up operation.

25. The method of claim 23, wherein generating the control voltage comprises monotonically changing the control voltage from the first voltage towards the second voltage in a step-by-step manner.

26. The method of claim 25, wherein changing the control voltage in the reverse direction comprises changing the control voltage in a step-by-step manner.

27. The method of claim 26, wherein a rate of the changing control voltage in the reverse direction is greater than a rate of the changing control voltage in the forward direction.

28. The method of claim 23, further comprising:
   changing the control voltage to the first voltage if the control voltage does not reach the second voltage within a predetermined time interval; and
   maintaining the control voltage at the first voltage for a predetermined duration.

29. The method of claim 23, further comprising:
   changing the control voltage from the second voltage to the first voltage if the magnitude of the output current exceeds the current threshold for a predetermined duration; and
   maintaining the control voltage at the first voltage for a predetermined duration.

30. An apparatus, comprising:
   means for monotonically changing a control voltage in a forward direction from a first voltage towards a second voltage;
   means for generating an output voltage from the control voltage;

means for detecting whether a magnitude of an output current exceeds a current threshold; and means for changing the control voltage in a reverse direction in response to the detecting means detecting that the magnitude of the output current exceeds the current threshold.

31. The apparatus of claim 30, further comprising means for disabling at least a portion of the generating means if the control voltage does not reach the second voltage within a first predetermined time interval.

32. The apparatus of claim 30, further comprising means for disabling at least a portion of the generating means in response to the detecting means detecting that the magnitude of the output current exceeds the current threshold for more than a predetermined duration.

* * * * *